(12) United States Patent
Qin et al.

(10) Patent No.: US 11,056,895 B2
(45) Date of Patent: Jul. 6, 2021

(54) MULTI-PORT CHARGER

(71) Applicant: Black & Decker Inc., New Britain, CT (US)

(72) Inventors: Fugen Qin, Timonium, MD (US); Hussein M. Nosair, Parkville, MD (US); Paul A. Stephenson, Parkville, MD (US); Brian K. Wohltmann, Shrewsbury, PA (US); Marc W McKinley, York, PA (US); Nathan J. Cruise, Phoenix, MD (US)

(73) Assignee: Black & Decker Inc., New Britain, CT (US)

( * ) Notice: Subject to any disclaimer, the term of this patent is extended or adjusted under 35 U.S.C. 154(b) by 146 days.

(21) Appl. No.: 16/164,105

(22) Filed: Oct. 18, 2018

(65) Prior Publication Data
US 2019/0372365 A1    Dec. 5, 2019

Related U.S. Application Data

(60) Provisional application No. 62/574,011, filed on Oct. 18, 2017.

(51) Int. Cl.
*H02J 7/00* (2006.01)
*H01M 10/613* (2014.01)
*H01M 10/44* (2006.01)
*H01M 10/48* (2006.01)
*H01M 50/10* (2021.01)

(52) U.S. Cl.
CPC ......... *H02J 7/0027* (2013.01); *H01M 10/443* (2013.01); *H01M 10/482* (2013.01); *H01M 10/486* (2013.01); *H01M 10/613* (2015.04); *H01M 50/10* (2021.01); *H02J 7/00* (2013.01); *H02J 7/0021* (2013.01); *H02J 7/0024* (2013.01); *H02J 7/0047* (2013.01); *H02J 7/0048* (2020.01); *H02J 7/0049* (2020.01)

(58) Field of Classification Search
USPC ..................... 320/108, 109, 110, 111, 112
See application file for complete search history.

(56) References Cited

U.S. PATENT DOCUMENTS

| 2006/0070384 A1* | 4/2006 | Ertel | G01T 1/2928 62/3.3 |
|---|---|---|---|
| 2008/0251246 A1* | 10/2008 | Ohkuma | B60L 58/26 165/287 |
| 2015/0004459 A1* | 1/2015 | Yamamoto | H01M 10/613 429/120 |

FOREIGN PATENT DOCUMENTS

| JP | 2015087204 A | * | 5/2015 | |
| JP | 5851156 B2 | * | 2/2016 | |
| JP | 2017122521 A | * | 7/2017 | |
| JP | 2018033288 A | * | 3/2018 | ............... B25H 3/02 |
| JP | 2018033289 A | * | 3/2018 | |
| JP | 2018037460 A | * | 3/2018 | ............... B25H 3/02 |
| WO | WO-2015029830 A1 | * | 3/2015 | .......... H01M 2/1094 |
| WO | WO-2015033694 A1 | * | 3/2015 | .......... H01M 10/613 |
| WO | WO-2017047205 A1 | * | 3/2017 | ............. H01M 2/10 |

* cited by examiner

Primary Examiner — Brian Ngo
(74) Attorney, Agent, or Firm — Michael Aronoff

(57) ABSTRACT

The present disclosure is directed to a battery charger capable of charging a plurality of battery packs. The charger includes the ability to cool electronic components of the charger with a first fan and to cool the battery packs with a set of second fans.

9 Claims, 18 Drawing Sheets

US 11,056,895 B2

MULTI-PORT CHARGER

RELATED APPLICATIONS

This application claims priority under 35 U.S.C. § 119(e) to U.S. Provisional Patent Application No. 62/574,011, filed Oct. 18, 2018, titled "Multi-Port Charger."

TECHNICAL FIELD

This application relates to a system and method for charging a plurality of battery packs. In one implementation, the system includes a bin or housing for receiving one or more battery packs. The charger may implement a charging scheme based on a voltage of the one or more battery packs and a temperature of the one or more battery packs.

BACKGROUND

Rechargeable battery packs require a battery charger to recharge the battery packs after they have been used and depleted. Typically, a single battery charger will charge a single battery pack. The ability to charge a plurality of battery packs with a single charging device is particularly advantageous. It is known to charge a plurality of battery packs using a single battery charger. As the battery charger operates to charge the plurality of battery packs, there is the potential for the temperature of the charging electronics to increase and potentially exceed operating parameters. This has the potential effect to shut down the charger or cause the charger to operate less efficiently. As such, it is preferable to have the ability to cool the charging electronics during charger operation. It is also common for the battery packs to be placed in to a charger immediately after use. In these situations, it is not uncommon for the temperature of the battery pack to exceed optimal charging temperatures. This has the potential effect to prevent the battery pack from being charged or cause the battery pack to be charged less efficiently. As such, it is preferable to have the ability to cool the battery packs prior to and during operation of the battery charger.

SUMMARY

An aspect of the present invention includes a battery charger capable of charging a plurality of battery packs. An exemplary embodiment of the battery charger comprises a housing including a lower portion and an upper portion, the upper portion coupled to the lower portion in a manner to allow the upper portion to open and close relative to the lower portion and seal the lower portion; a plurality of receptacles in the lower portion, each receptacle including a battery pack interface, each interface including a terminal block to mechanically and electrically mate with a corresponding terminal block of a battery pack to transfer energy from the charger to the battery pack and to communicate information between the charger and the battery pack; a first fan that provides airflow past a plurality of charger electronic components to cool the charger electronic components, airflow from the first fan directed down a central plane of the charger past the charger electronic components; and a set of second fans, one fan of the set of second fans for each receptacle to provide airflow through the battery pack inserted in the respective receptacle.

In the aforementioned charger, the upper portion may be coupled to the lower portion by a hinge.

In the aforementioned charger, the upper portion may be coupled to the lower portion to allow the upper portion to open and close relative to the lower portion.

In the aforementioned charger, the upper portion may be coupled to the lower portion to allow the upper portion to provide a seal with the lower portion.

The aforementioned charger may further comprise a printed circuit board upon which the charger electronic components are mounted.

In the aforementioned charger, the charger electronic components may include a charger power supply.

The aforementioned charger may further comprise an inlet vent on a first side of the lower portion and an outlet vent on a second side of the lower portion, the first side of the lower portion being opposed to the second side of the lower portion.

The aforementioned charger may further comprise an inlet vent for each fan of the set of second fans and an internal airflow opening for moving air into the corresponding receptacle.

The aforementioned charger may further comprise a charger control circuit that controls the overall operation of the charger and a battery control circuit for each receptacle that communicates with the inserted battery pack through the corresponding terminal block and communicates with the charger control circuit.

Another aspect of the present invention includes a method for charging a plurality of battery packs in a single battery charger having a plurality of battery pack receptacles, comprising the steps of: monitoring each of the plurality of battery pack receptacles to determine into which of the plurality of battery pack receptacles a battery pack has been inserted; determining a temperature, a voltage and a state of charge of each battery pack inserted into one of the plurality of battery pack receptacles; determine a priority order for charging all of the battery packs inserted into the plurality of battery pack receptacle; charging a first battery pack in the priority order; upon completing the charging of the first battery pack in the priority order, determining an updated priority order for charging all of the remaining battery packs inserted into the plurality of battery pack receptacles; and repeating charging the first battery pack in the updated priority order and repeating determining the updated priority order until all of the battery packs in the charger have been charged.

In the aforementioned method for charging a plurality of battery packs in a single charger, the step of determining a priority order for charging the battery packs may be based on the temperature of the battery packs first and the voltage of the battery packs second.

In the aforementioned method for charging a plurality of battery packs in a single charger, the charger may charge cooler battery packs first.

In the aforementioned method for charging a plurality of battery packs in a single charger, the charger may place the battery packs in priority sets based on temperature ranges.

In the aforementioned method for charging a plurality of battery packs in a single charger, a first highest priority set may include battery packs having a temperature ranging from 10-30 degrees Celsius, a second highest priority set may include battery packs having a temperature ranging from 30-45 degrees Celsius, a third highest priority set may include battery packs having a temperature ranging from 0-10 degrees Celsius, a fourth highest priority set may include battery packs having a temperature ranging from 45-60 degrees Celsius and a fifth highest priority set may include battery packs having a temperature greater than 60 degrees Celsius or less than 0 degrees Celsius.

In the aforementioned method of charging a plurality of battery packs in a single charger, the battery packs in each priority set may be further prioritized by the voltage of the battery pack.

In the aforementioned method of charging a plurality of battery packs in a single charger, the battery pack with the higher voltage within the priority set may be charged first.

These and other advantages and features will be apparent from the description and the drawings.

DETAILED DESCRIPTION

Figure 1:
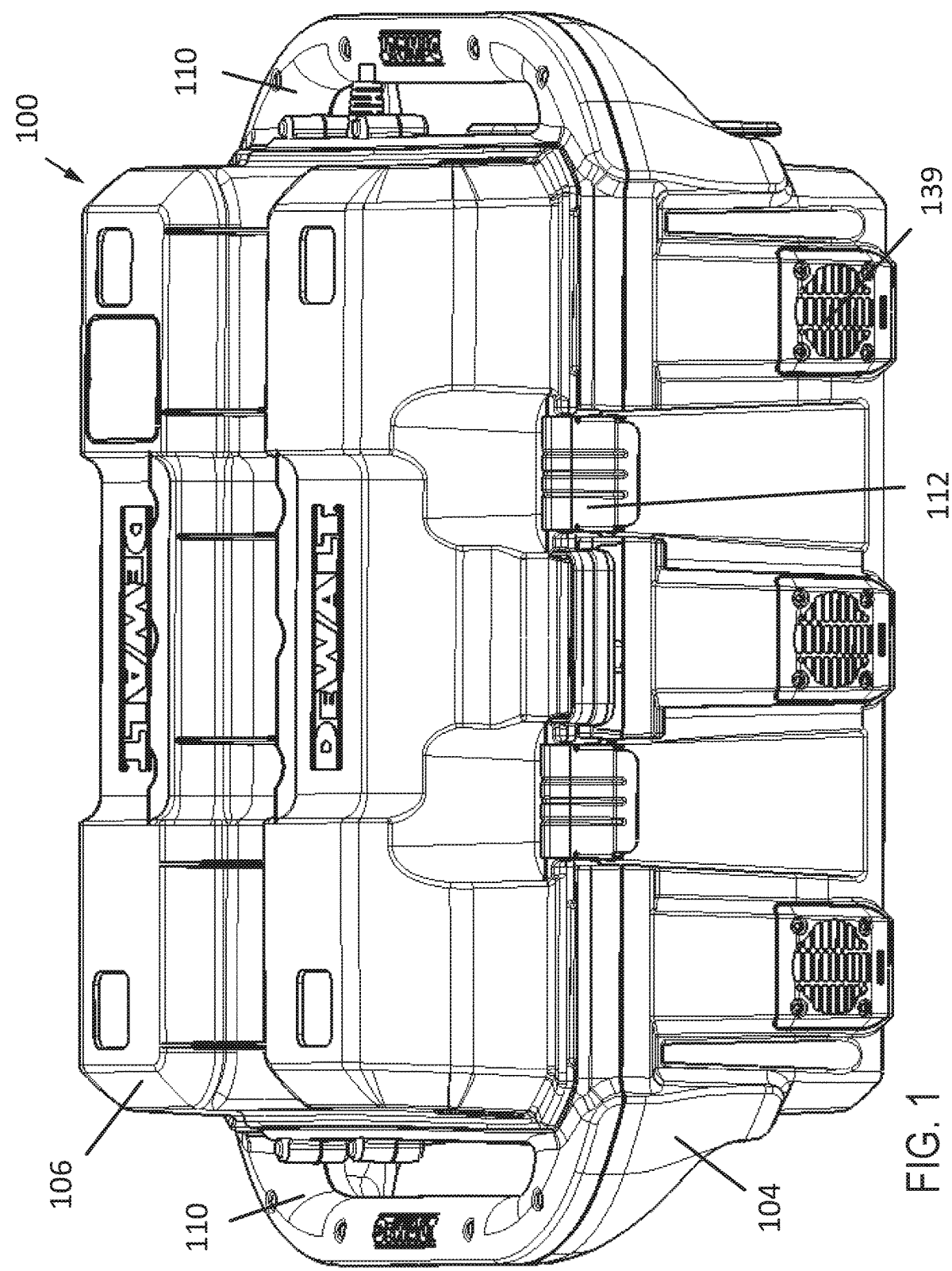
FIG. 1 is a top, front view of an exemplary multi-port charger.
Figure 2:
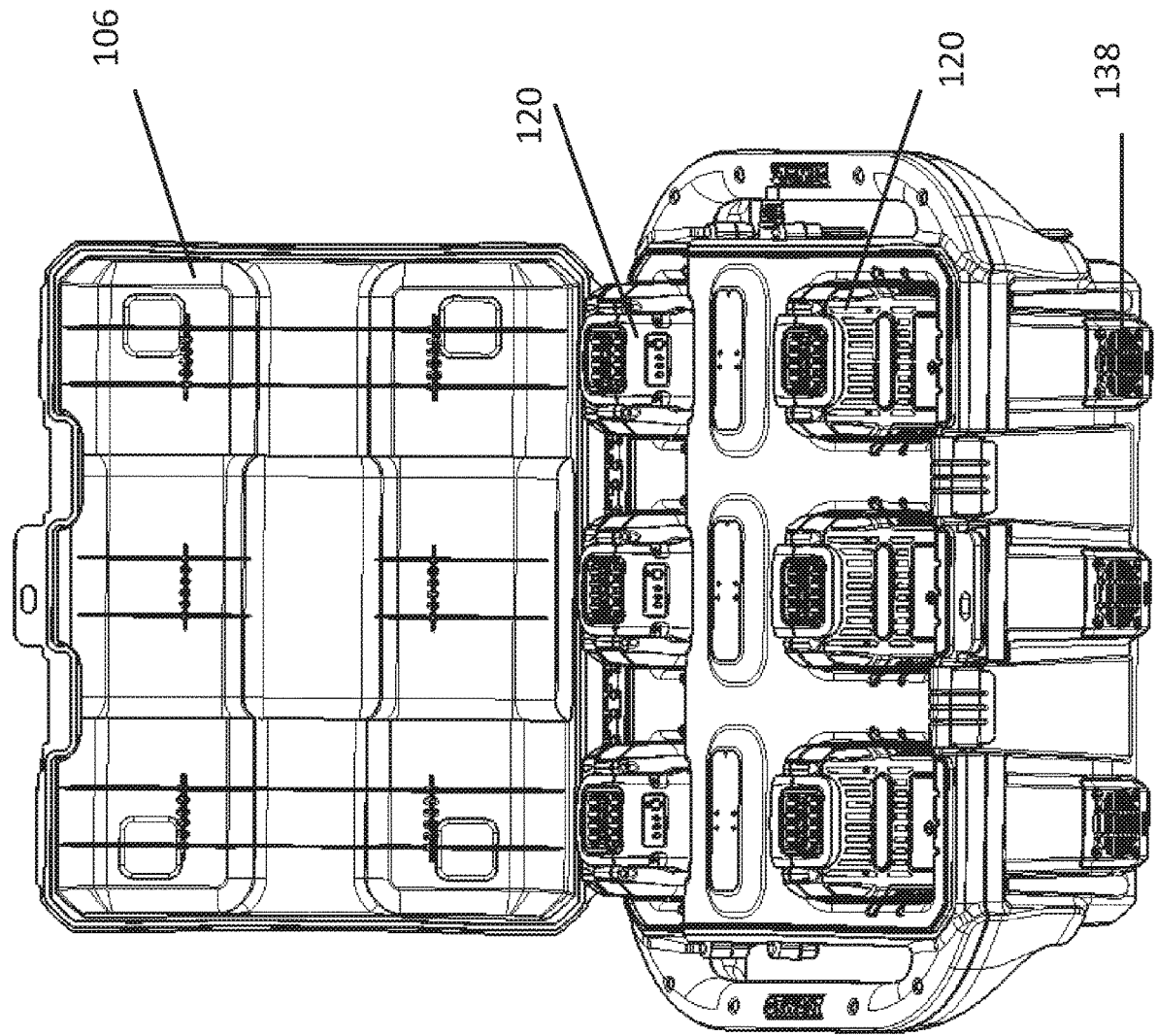
FIG. 2 is a top, front view of a fully populated charger of FIG. 1 with an open cover.
Figure 3:
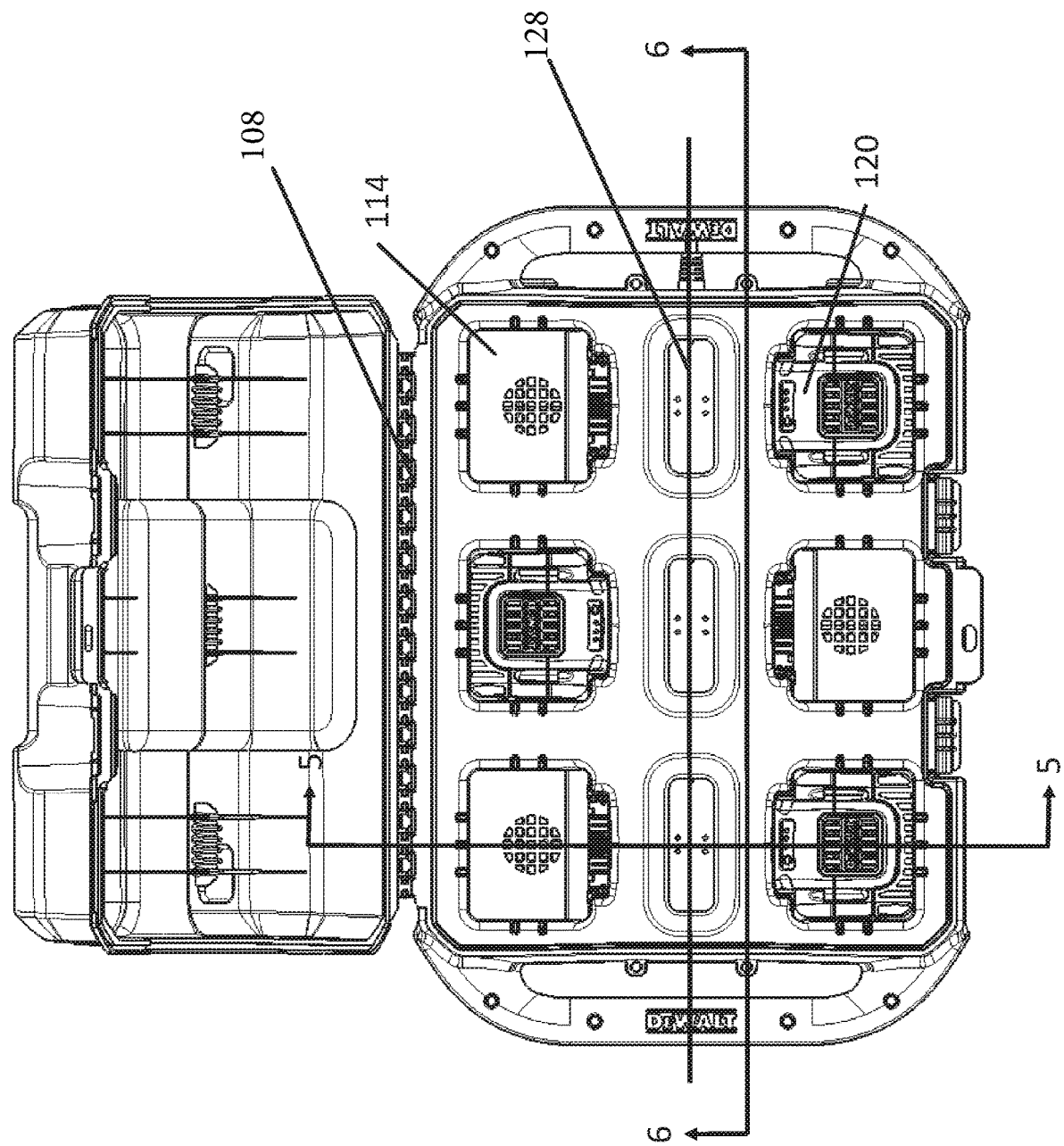
FIG. 3 is a top view of a partially populated charger of FIG. 1.
Figure 4:
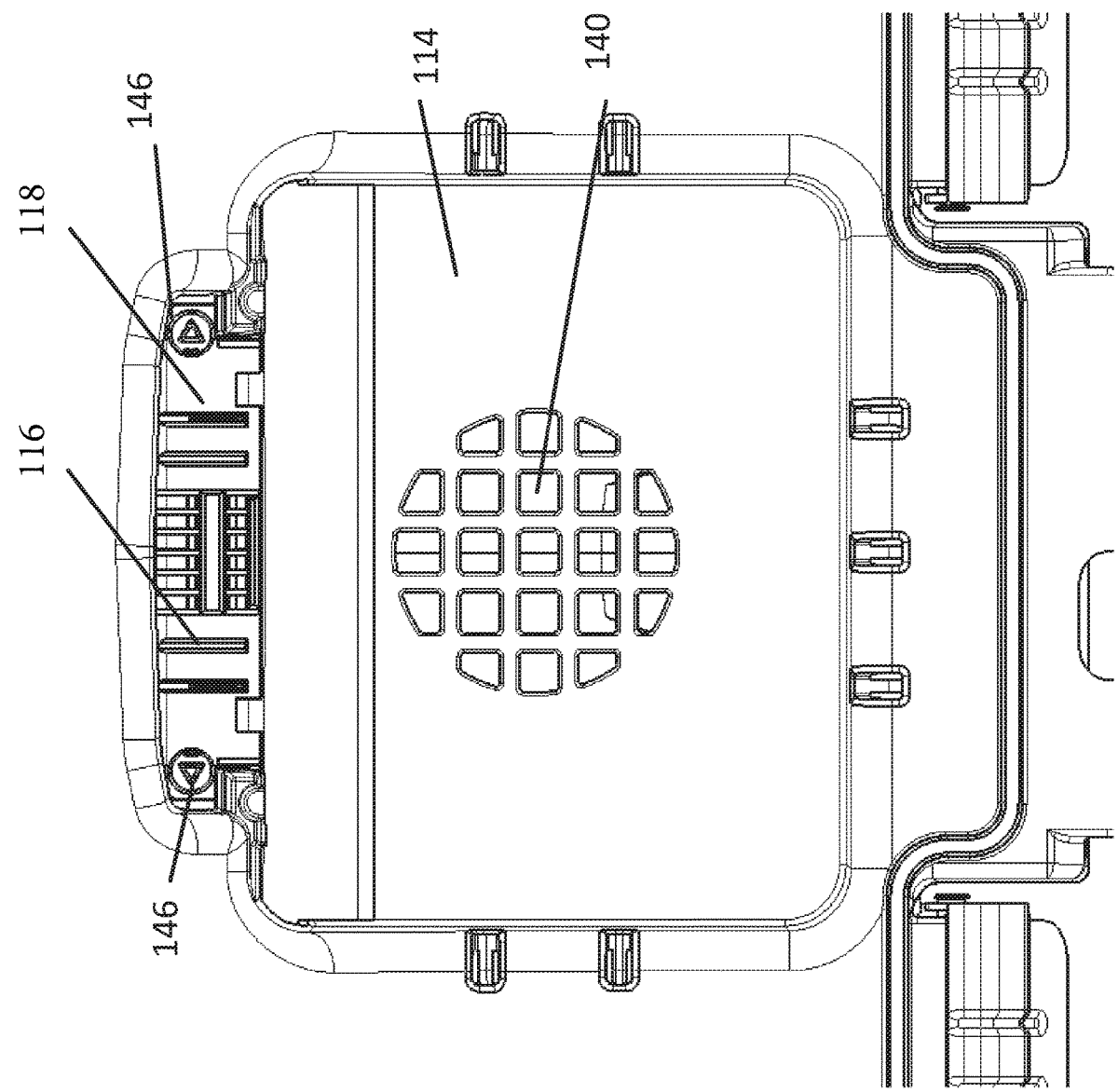
FIG. 4 is a top view of a battery pack receptacle of the charger of FIG. 1.
Figure 5:
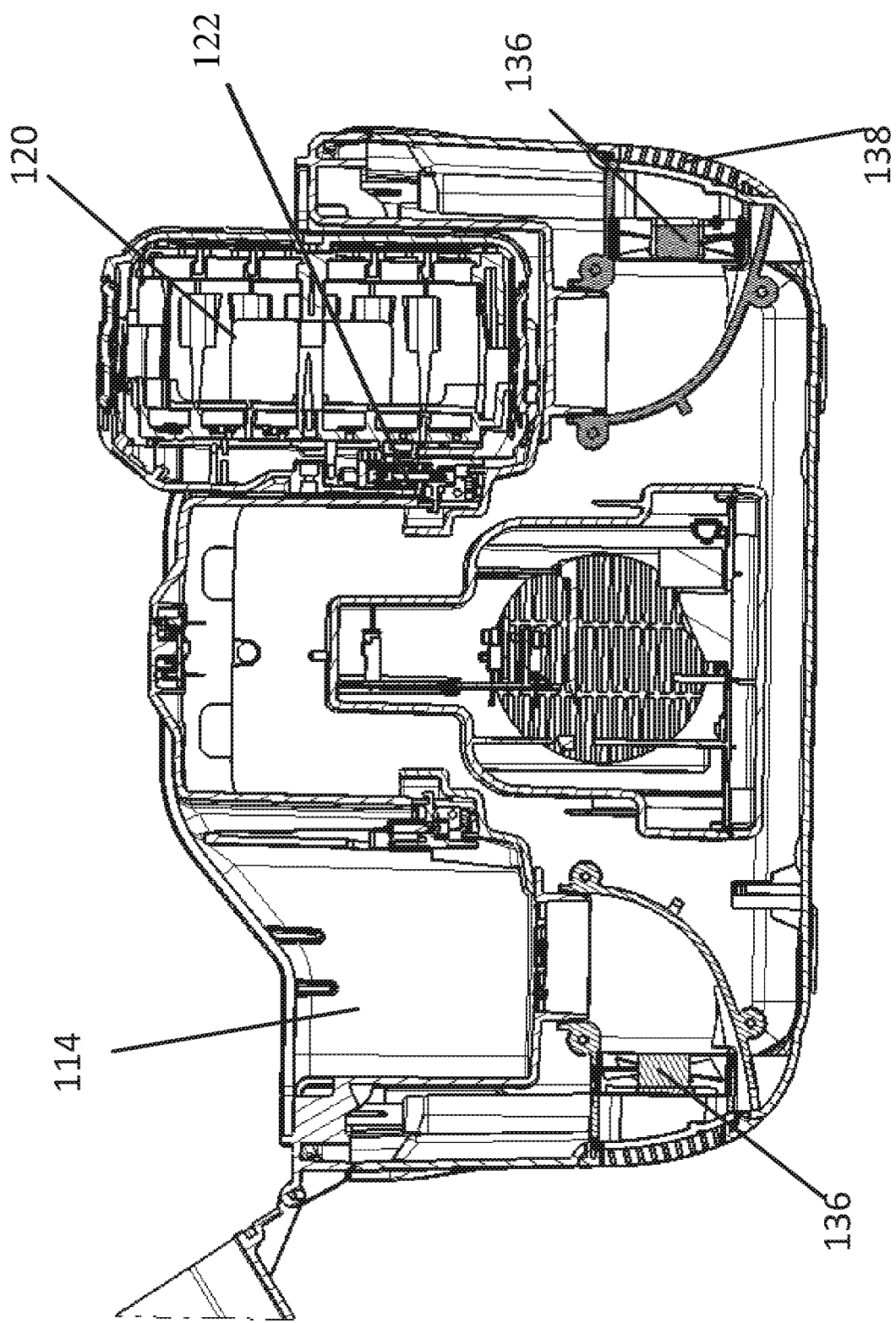
FIG. 5 is a section view of the charger of FIG. 3, along line 5-5.
Figure 6:
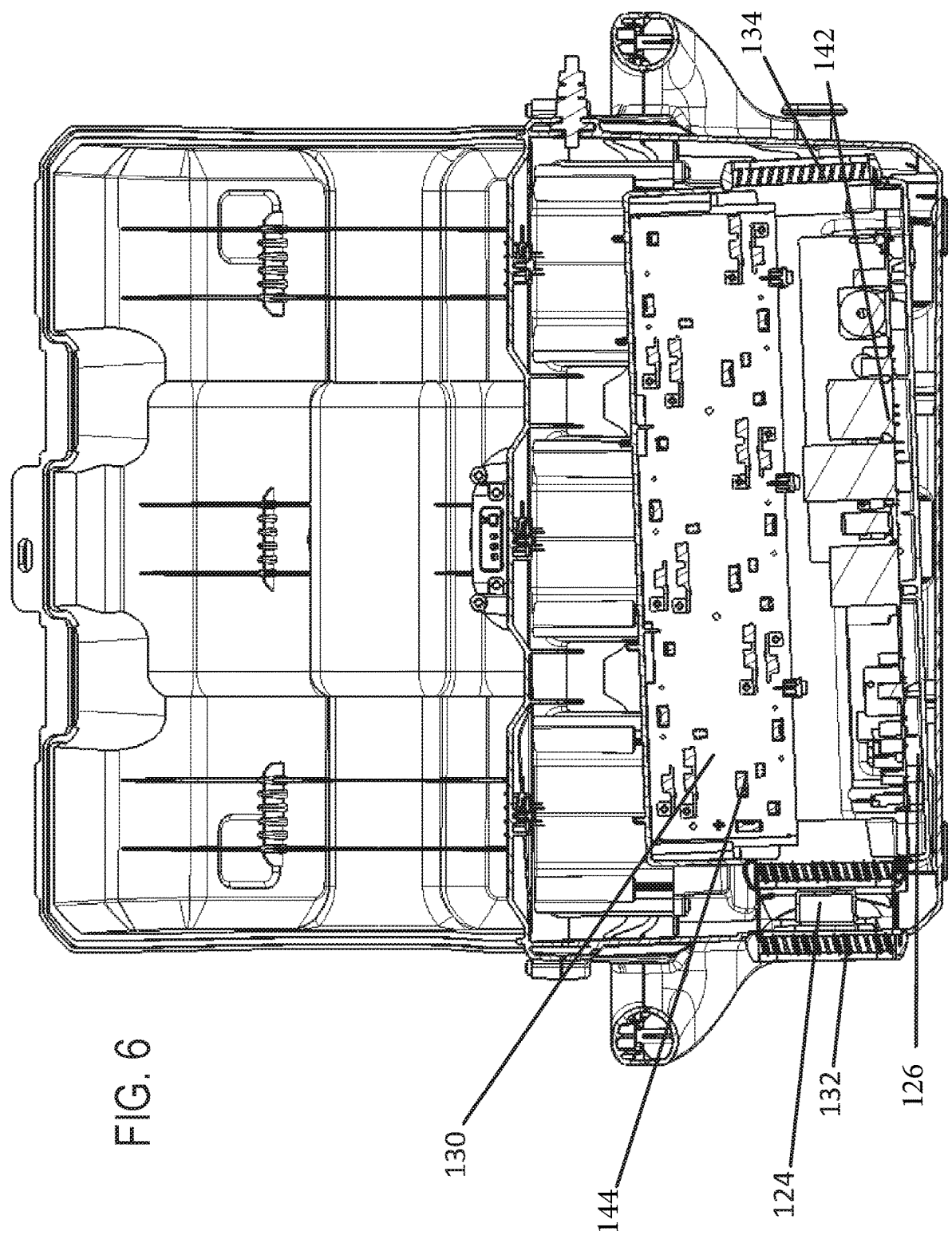
FIG. 6 is a section view of the charger of FIG. 3, along line 6-6.
Figure 7:
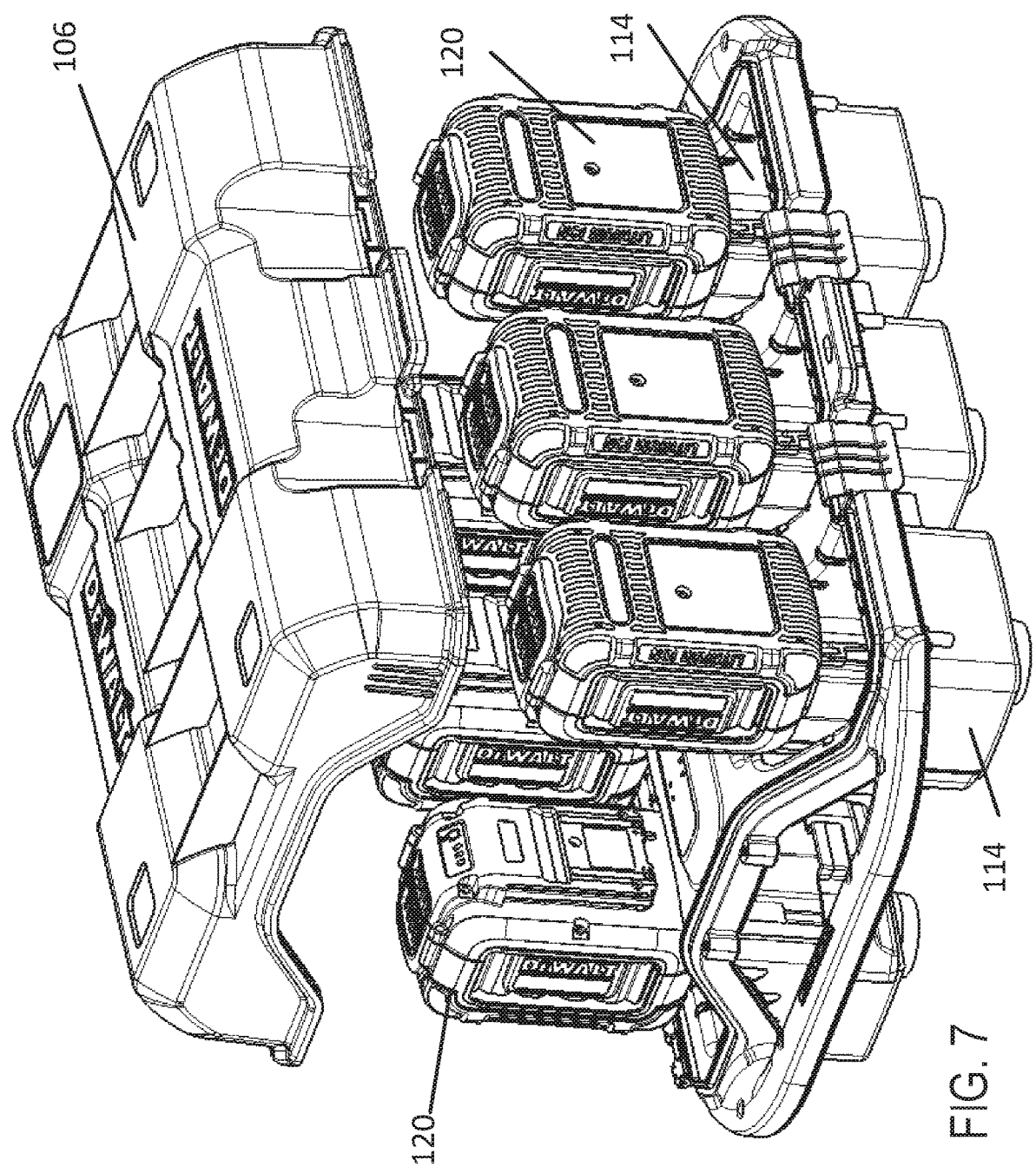
FIG. 7 is a partial exploded view of the charger of FIG. 1.
Figure 8:
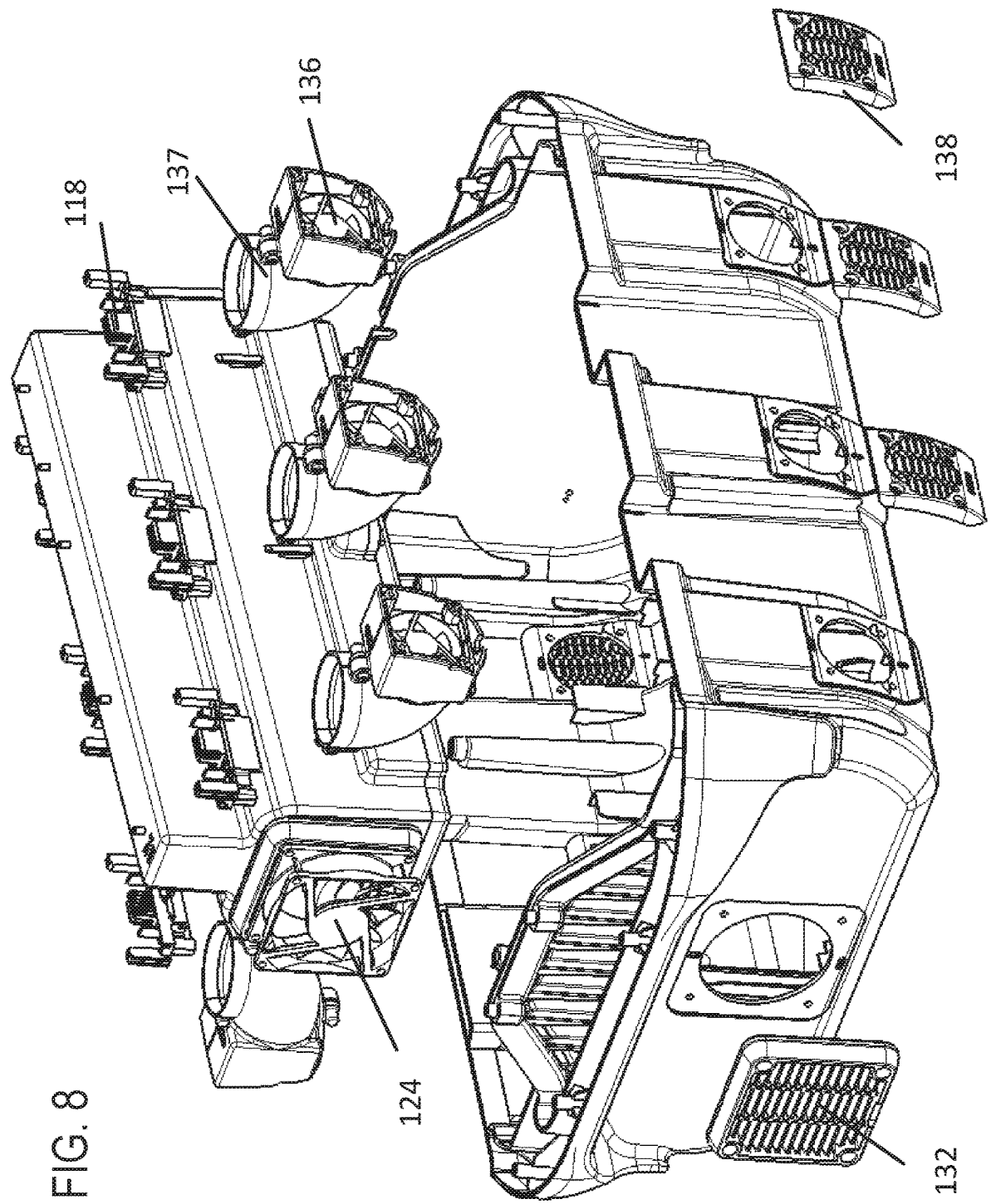
FIG. 8 is a partial exploded view of the charger of FIG. 1.
Figure 9A:
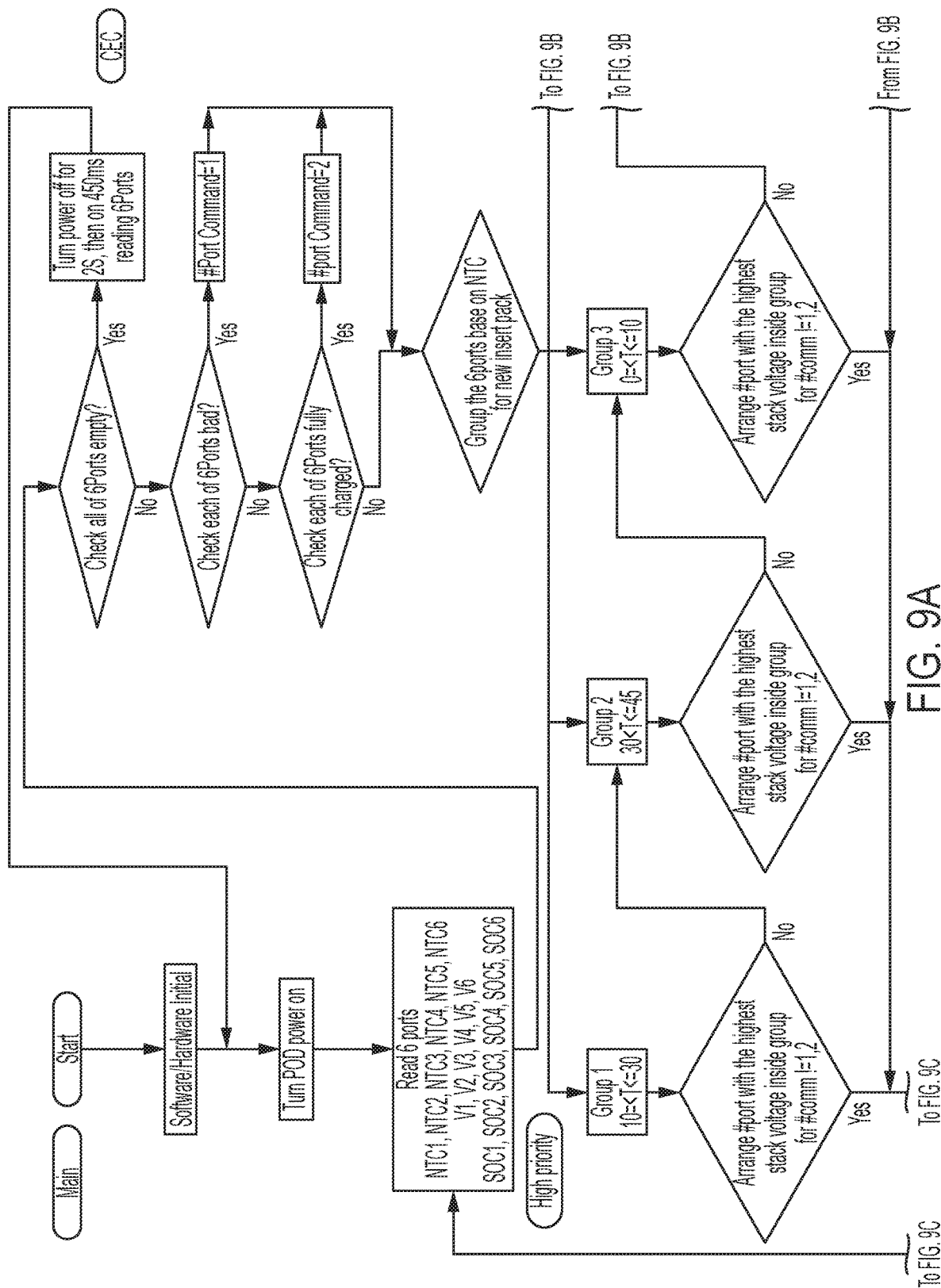
FIGS. 9A-9D together comprise a flow chart for charging a plurality of battery packs in the charger of FIG. 1.
Figure 9B:
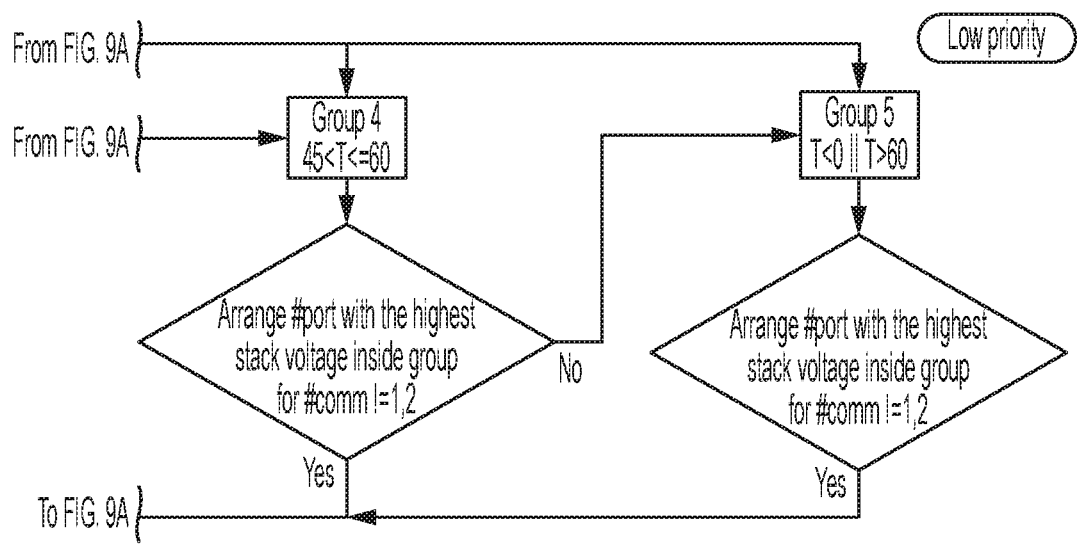
Figure 9C:
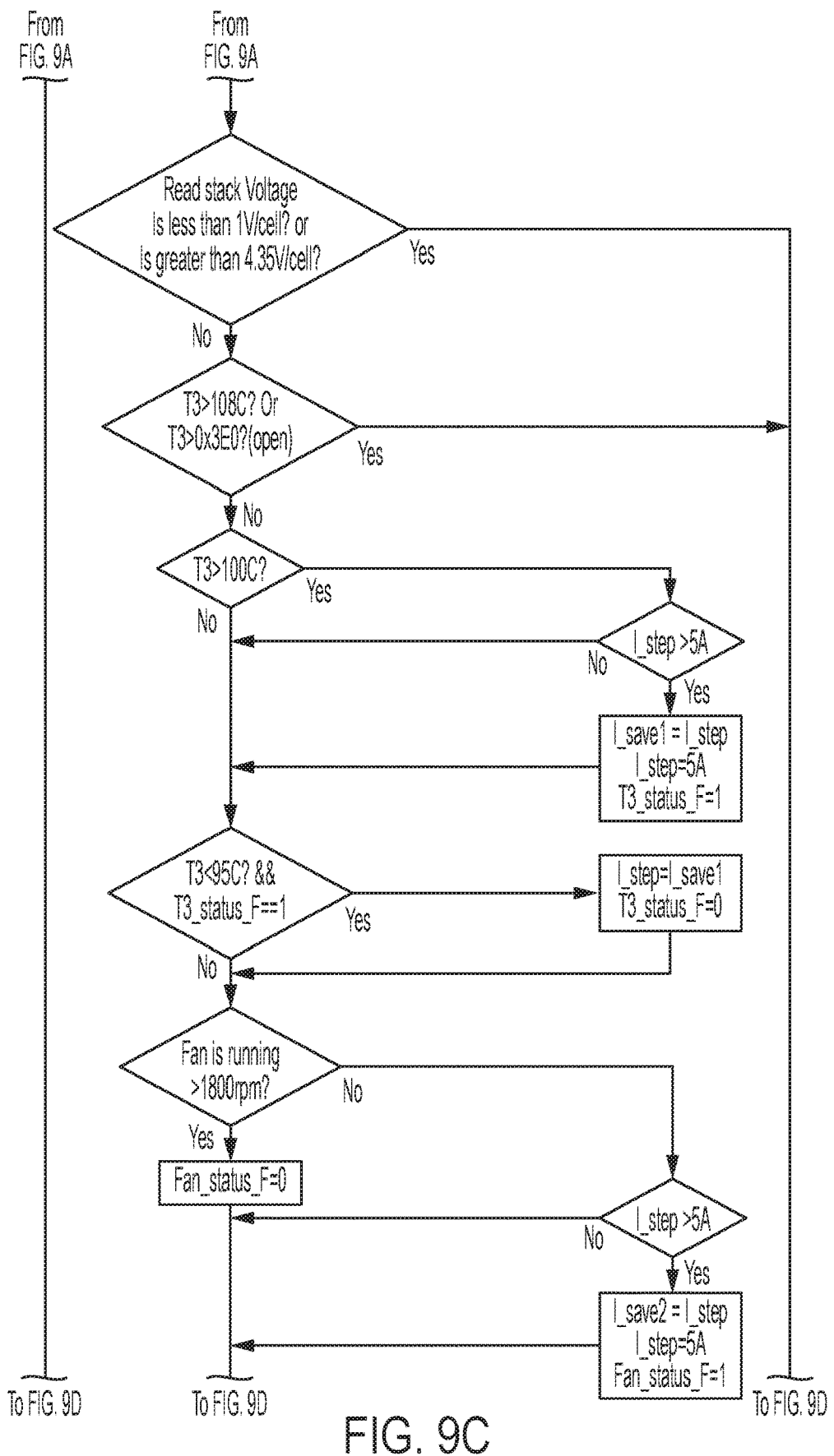
Figure 9D:
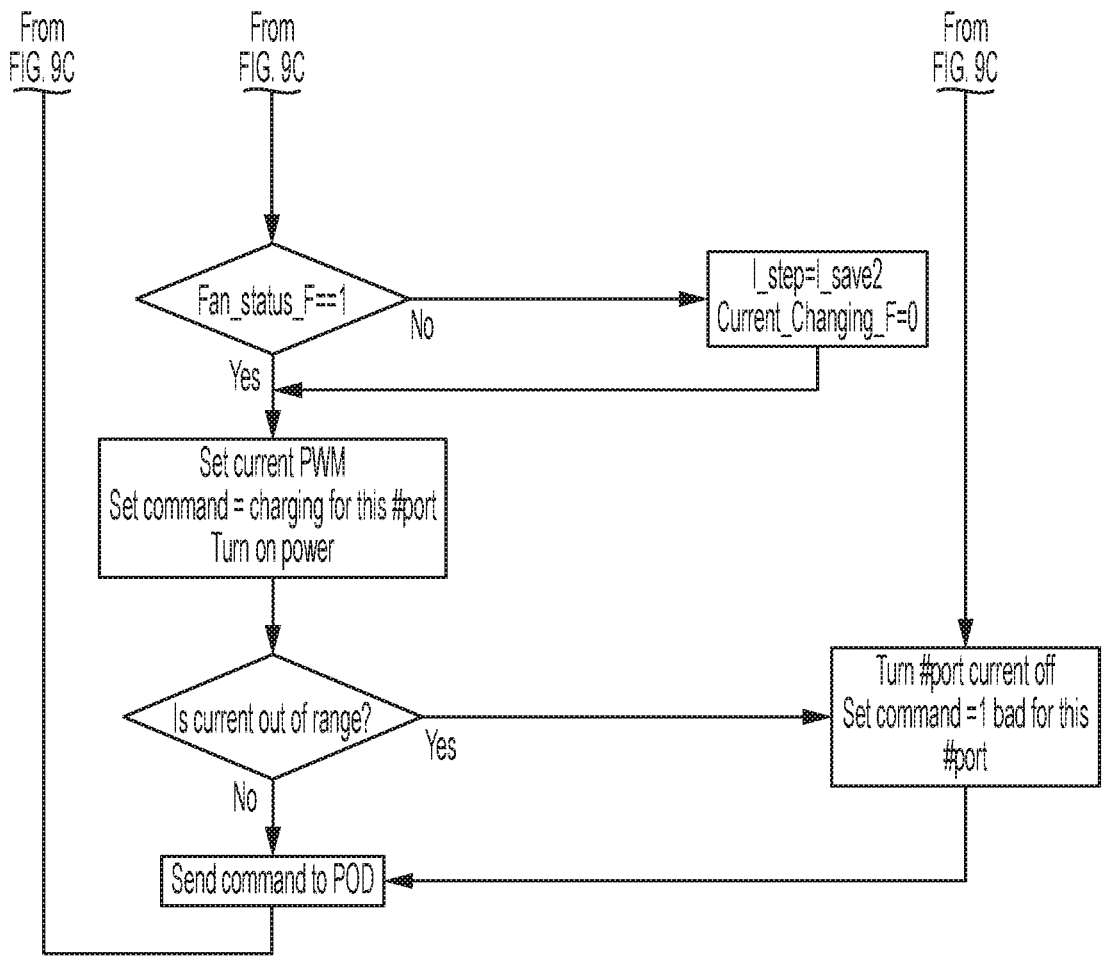
Figure 10A:
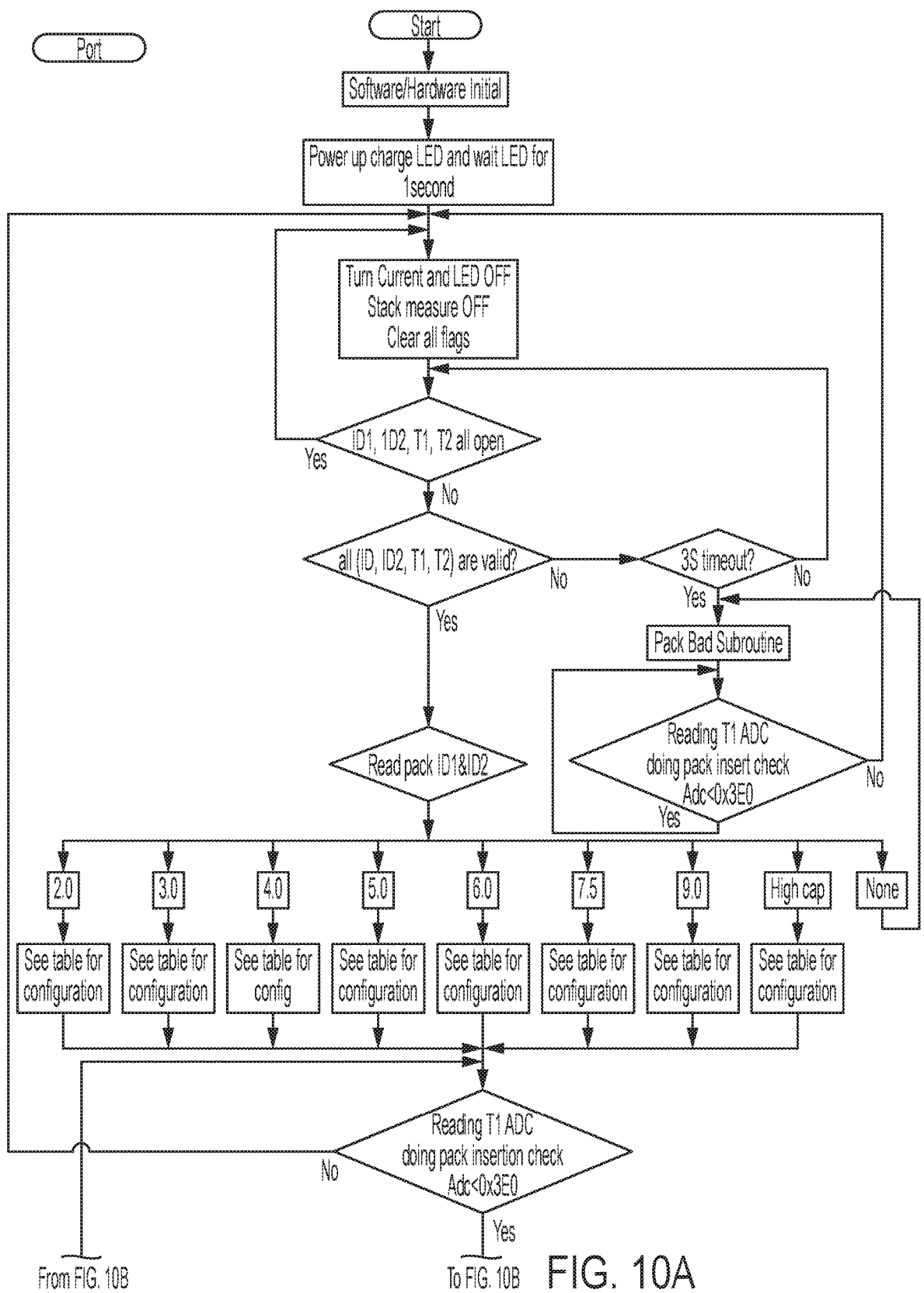
FIGS. 10A-10B together comprise a flow chart for charging a plurality of battery packs in the charger of FIG. 1.
Figure 10B:
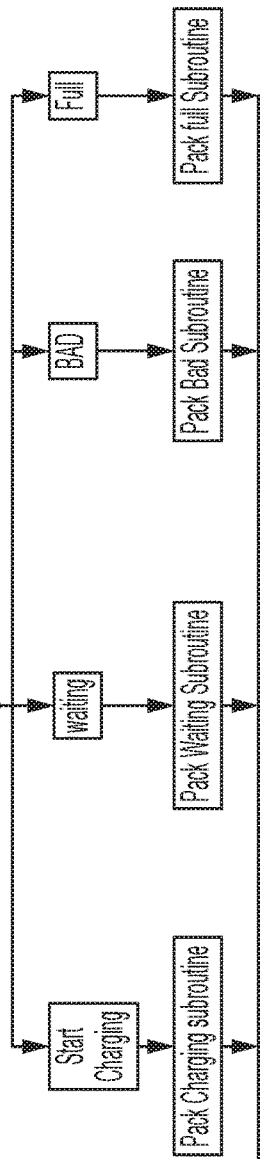
Figure 11A:
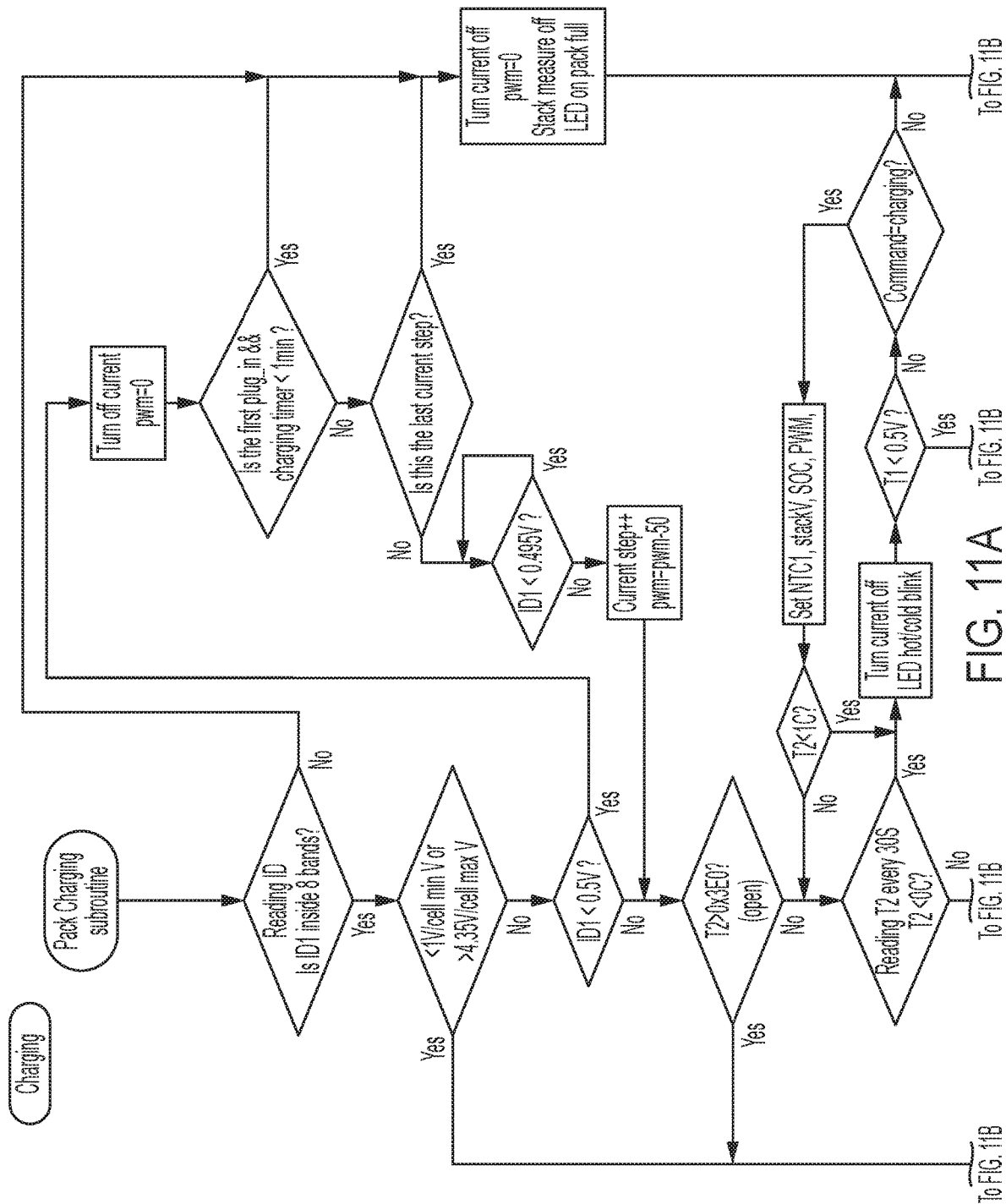
FIGS. 11A-11C together comprise a flow chart for charging a plurality of battery packs in the charger of FIG. 1.
Figure 11B:
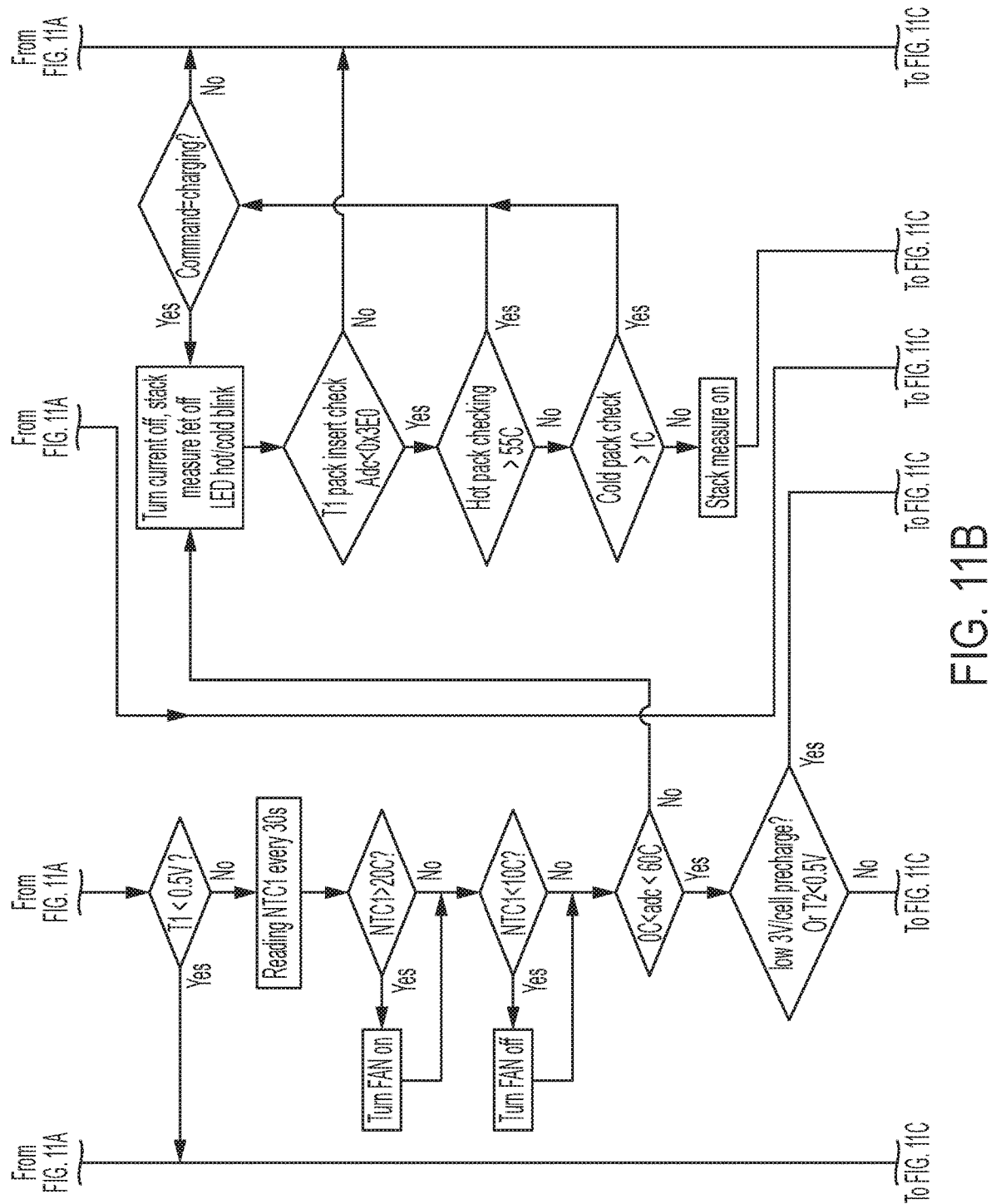
Figure 11C:
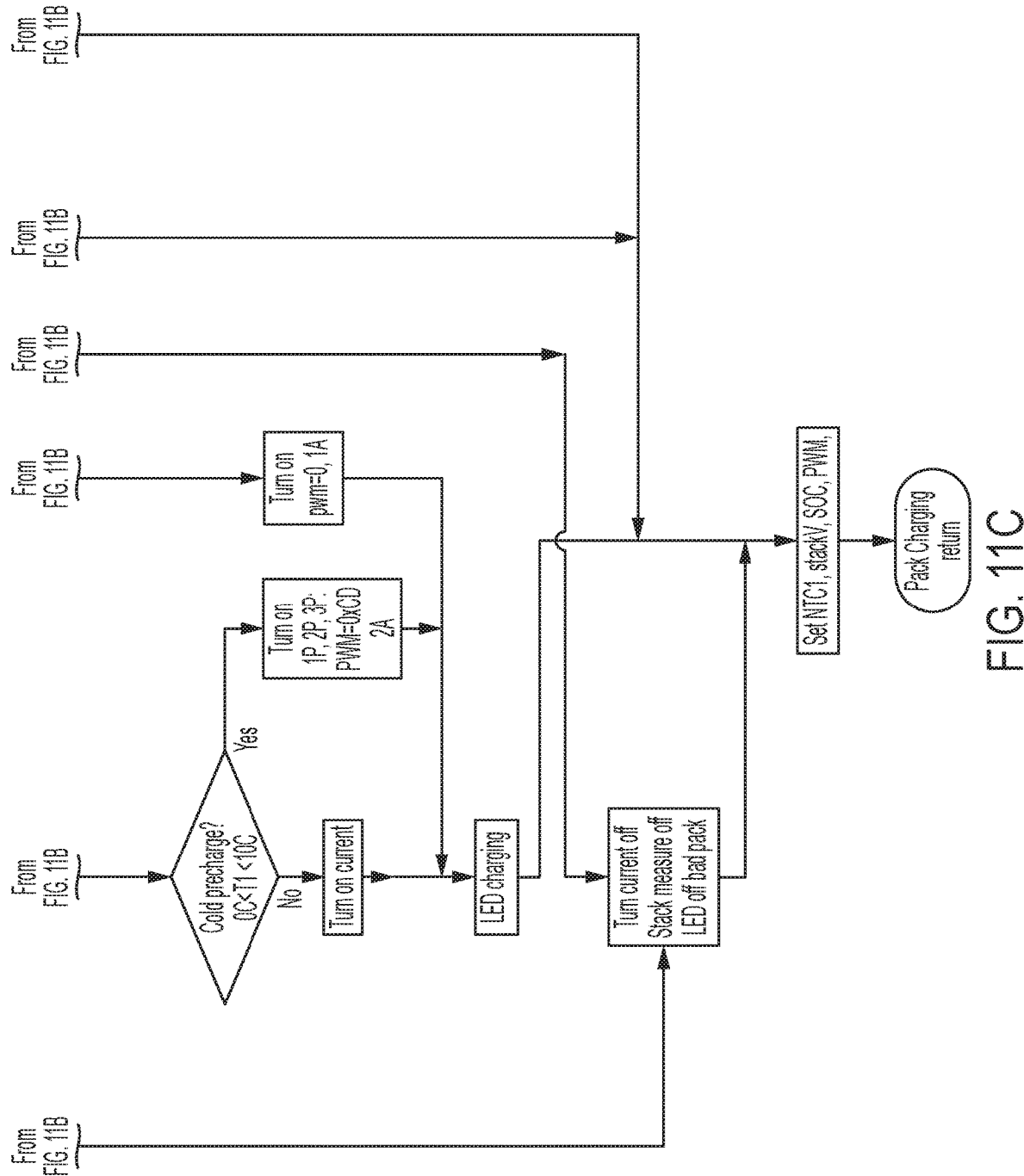
Figure 15:
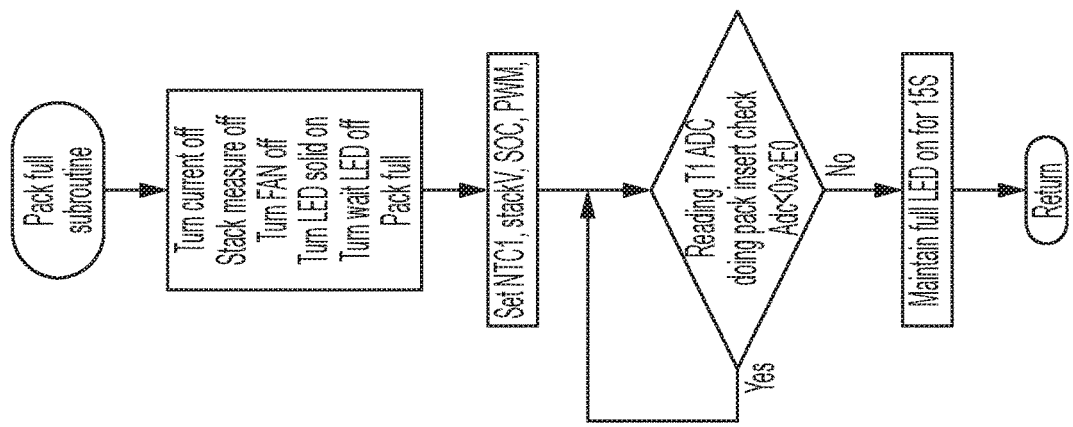
FIG. 15 is a flow chart for charging a plurality of battery packs in the charger of FIG. 1.
Figure 14:
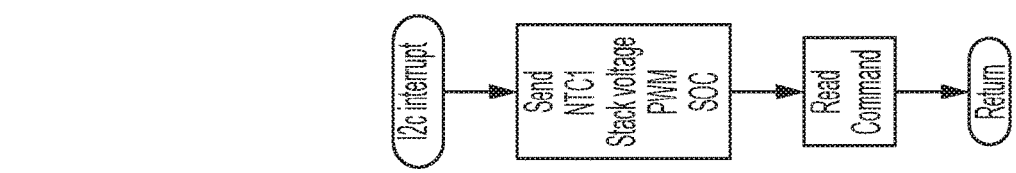
FIG. 14 is a flow chart for charging a plurality of battery packs in the charger of FIG. 1.
Figure 13:
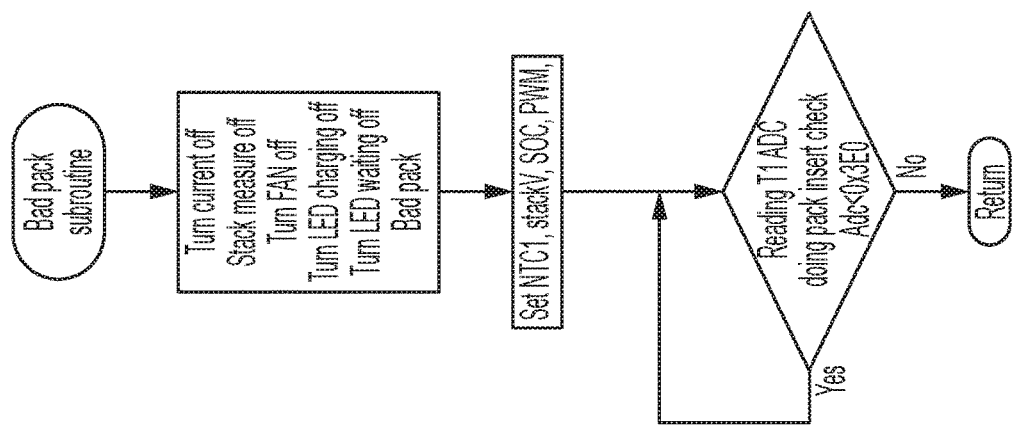
FIG. 13 is a flow chart for charging a plurality of battery packs in the charger of FIG. 1.
Figure 12:
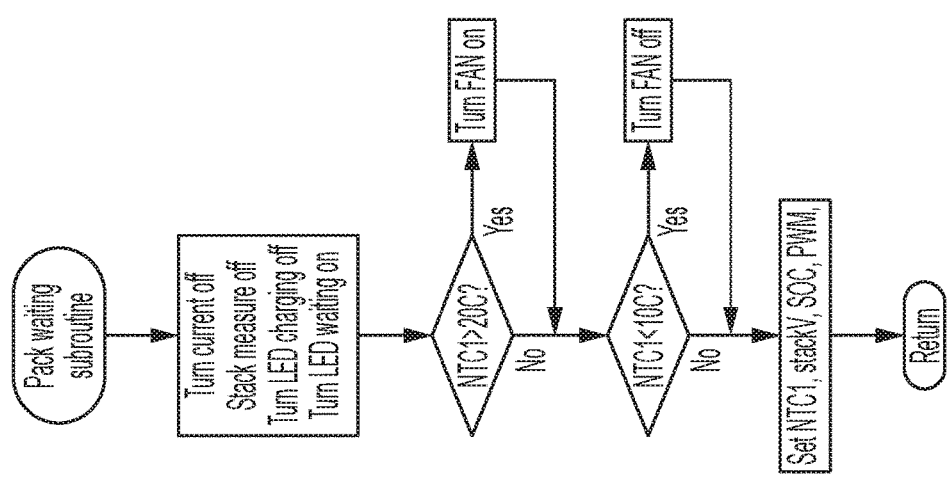
FIG. 12 is a flow chart for charging a plurality of battery packs in the charger of FIG. 1.

The charger 100 includes a housing 102, sometimes referred to as a bin. The housing 102 includes a lower portion 104—in a form of a tub—and an upper portion 106 that serves as a lid for the lower portion 104. The upper portion 106 (lid) is coupled to the lower portion 104 (tub) in a manner to allow the upper portion 106 to open and close relative to the lower portion 104 and seal the lower portion 104. The 106 lid may be coupled to the tub 104 by a set of hinges 108, for example.

The charger 100 may also include a pair of handles 110 to carry the charger 100. The charger 100 may also include a latching mechanism 112 for latching the lid 106 to the tub 104.

The charger 100 includes a plurality of ports/receptacles 114 in the lower portion 104. Each port 114 includes a battery pack interface 116. The interface 116 includes a terminal block 118 to mechanically and electrically mate with a corresponding terminal block 122 of the battery pack 120 to transfer energy from the charger 100 to the battery pack 120 and to communicate information between the charger 100 and the battery pack 120. The charger 100 may include two or more ports 114. In the example illustrated herein, the charger 100 includes six ports 114. Each port 114 is configured to receive a single battery pack 120.

The charger 100 may also include a first fan 124 that provides airflow past the charger electronics 126 to cool the charger electronics 126. The charger electronics fan 124 directs airflow down a central plane 128 of the charger 100 past printed circuit boards (PCBs) 130 having the charger power supply electronics 126 mounted thereon. The charger lower portion 104 includes an inlet vent 132 and an outlet vent 134 for moving air through the charger housing past the charger electronics 126.

The charger 100 may also include a fan 136 for each port 114 that provide airflow through a battery pack 120 inserted in the respective port 114. The charger lower portion 104 includes an inlet vent 138 for each battery fan 136, an airflow director 137 and an internal airflow opening 140 for moving air into the receptacle 114 to cool the inserted battery pack 120.

The charger 100 includes a first microprocessor/microcontroller 142—referred to as a master—that controls the overall operation of the charger 100. The charger 100 also includes a set of second microprocessors/microcontrollers 144—referred to as a slave—for each receptacle 114 (six in the disclosed example charger). Each slave microprocessor 144 communicates with an inserted battery pack 120 through the terminal block 118 and communicates with the master microprocessor 142.

The disclosed charger 100 charges a single battery pack 120 at time. If there are multiple battery packs 120 present in the charger 100, the charger 100 will charge the present battery packs 120 sequentially. In determining if any battery packs 120 are present in the charger 100 and determining the order in which to charge any present battery packs 120 (if there is more than one battery pack 120 present), the charger 100 determines how many battery packs 120 are inserted in the charger 100 and their status.

In a first step, the charger 100 monitors each port/receptacle 114 to determine if a battery pack 120 has been inserted into that port/receptacle 114. The charger 100 charges a single port 114 (battery pack 120) at a time. If there are additional ports 114 having battery packs 120 inserted therein, the ports 114 with the inserted, additional battery packs 120 will be in a wait mode while the charger 100 charges the one battery pack 120.

In a second step, through the terminal block 118, the charger 100 is able to determine/read the temperature of the battery pack 120, the voltage of the battery pack 120 and the state of charge of the battery pack 120. The charger 100 will read the temperature, voltage and state of charge of each seated pack 120, and each port 114 (slave micro 144) will send temperature, stack voltage, and state of charge to the main power control micro 142 (master micro).

In a third step, the charger 100 determines which battery pack 120 to charge first if multiple battery packs 120 are seated in the charger 100. The charger 100 will consider battery pack temperature first and battery pack voltage second. The charger 100 will prioritize the cooler battery packs 120 first, placing the battery packs 120 into sets based on temperature ranges, e.g. set 1 is for battery packs 120 in the 10-30 degree Celsius range, set 2 is for battery packs 120 in the 30-45 degree Celsius range, set 3 is for battery packs 120 in the 0-10 degree Celsius range and set 4 is for battery packs 120 in the 45-60 degree Celsius range and set 5 is for battery packs 120 having a temperature greater than 60 degree Celsius or less than 0 degree Celsius. The charger 100 will then prioritize the higher voltage level pack 120 within the temperature sets, e.g. if there are two packs 120 in set 1, one with a 30 V voltage level and one with a 28 V voltage level, the charger 100 will charge the 30 V pack 120 first, then the 28 V pack 120.

During the charging of a selected battery pack 120, the temperature and the voltage of any remaining, less than fully charged battery packs 120 in a wait mode may change. As such, when a battery pack 120 becomes fully charged, the charger 100 will reestablish the next priority que for the remaining battery packs 120 based on the current temperature and stack voltage. In essence, repeat step 3.

In a fifth step, if the charger 100 stops charging a selected battery pack 120 during the charging process for some reason, e.g., battery pack temperature is out of charging range or a battery cell fault, the charger 100 will automatically switch to the next priority battery pack 120 for charging. The next priority pack 120 will be selected from the rest of the inserted battery packs 120 based on the current temperature and stack voltage. As noted above, as the temperature and the voltage of a battery pack 120 in a wait mode port 114 may change while the selected battery 120 is being charged, the charger 100 will repeat step 3.

Each receptacle/port 114 includes a pair of springs 146. One of the springs 146 is positioned on each side of the terminal block 118. When a battery pack 120 is first inserted into a receptacle 114, the springs 146 initially prevent the battery pack terminal block 122 from fully seating with the charger terminal block 118. As such, the charger 100 does not recognize a battery pack 120 as being present and will not initiate a charge of the battery pack 120. When the charger lid 106 is fully closed (and latched to the lower housing 104 to keep the lid 106 closed), an internal side of the lid 106 forces the battery pack 120 to fully seat with the charger 100 (overcoming the spring force of the springs 146). As such, the charger 100 will be able to recognize a battery pack 120 as being present. The charger 100 may then assess the number of packs 120 present in the charger 100 and prioritize the charging sequence as noted above.

The main micro 142 monitors the charger electronics temperature. If the charger electronics temperature exceeds a first predetermined high temperature threshold, the master micro 142 turns on the charger electronics fan 124. If, and when the charger electronics temperature falls below a first predetermined low temperature threshold, the master micro 142 turns off the charger electronics fan 124.

The master micro 142 or the slave micro 144 monitors the battery pack temperature of each inserted battery pack 120. If the battery pack temperature of a battery pack 120 exceeds a second predetermined high temperature threshold, the master micro 142 or the slave micro 144 turns on the pack fan 136 of the high temperature battery pack 120. If, and when the battery pack temperature falls below a second predetermined low temperature threshold, the master micro 142 or the slave micro 144 turns off the battery pack fan 136.

Numerous modifications may be made to the exemplary implementations described above. These and other implementations are within the scope of this application.

The invention claimed is:

1. A charger comprising:
a housing including a lower portion and an upper portion, the upper portion coupled to the lower portion in a manner to allow the upper portion to open and close relative to the lower portion and seal the lower portion, a central plane bisecting the lower portion along a length of the lower portion and generally perpendicular to a bottom wall of the lower portion;
a plurality of receptacles in the lower portion, at least two receptacles on a first side of the central plane and at least two receptacles on a second side of the central plane, the at least two receptacles on the first side of the central plane and the at least two receptacles on the second side of the central plane being positioned side by side in a row extending along the central plane, each receptacle including a battery pack interface, each interface including a terminal block to mechanically and electrically mate with a corresponding terminal block of a battery pack to transfer energy from the charger to the battery pack and to communicate information between the charger and the battery pack;
a printed circuit board upon which a plurality of charger electronics is mounted, the printed circuit board coupled to the bottom wall of the lower portion and extending along the bottom wall of the lower portion along and generally perpendicular to the central plane;
an inlet vent on a first side of the lower portion, the inlet vent generally perpendicular to the central plane and an outlet vent on a second side of the lower portion, the outlet vent generally perpendicular to the central plane and generally parallel to the inlet vent, the first side of the lower portion being opposed to the second side of the lower portion;
a first fan that provides airflow from the inlet vent to the outlet vent past the plurality of charger electronic components along the printed circuit board and along the central plane to cool the charger electronic components; and
a set of second fans, one fan of the set of second fans for each receptacle to provide airflow through the battery pack inserted in the respective receptacle.

2. The charger, as recited in claim 1, wherein the upper portion is coupled to the lower portion by a hinge.

3. The charger, as recited in claim 1, wherein the upper portion is coupled to the lower portion to allow the upper portion to open and close relative to the lower portion.

4. The charger, as recited in claim 1, wherein the upper portion is coupled to the lower portion to allow the upper portion to provide a seal with the lower portion.

5. The charger, as recited in claim 1, wherein the charger electronic components include a charger power supply.

6. The charger, as recited in claim 1, further comprising an inlet vent for each fan of the set of second fans and an internal airflow opening for moving air into the corresponding receptacle.

7. The charger, as recited in claim 1, further comprising a charger control circuit that controls the overall operation of the charger and a battery control circuit for each receptacle that communicates with the inserted battery pack through the corresponding terminal block and communicates with the charger control circuit.

8. The charger, as recited in claim 1, further comprising a generally tubular housing extending from the first fan to the outlet vent along the central plane through which the airflow is directed, the tubular housing including a first wall on the first side of the central plane and generally parallel to the central plane, an edge of the first wall adjacent to a first side of the printed circuit board in a direction parallel to the central plane and a second wall on the second side of the central plane and generally parallel to the central plane, an edge of the second wall adjacent to a second side of the printed circuit board in the direction parallel to the central plane.

9. The charger, as recited in claim 1, wherein each of the receptacles receives a battery pack in a receiving direction, the receiving direction generally parallel to the central plane and wherein each of the receptacles includes a base wall generally perpendicular to the central plane, each base wall including an airflow opening that passes airflow from an associated second fan into a received battery pack.

* * * * *